United States Patent

[11] 3,631,871

[72] Inventor Tetsuo Shimosaki
 Hiroshima, Japan
[21] Appl. No. 869,572
[22] Filed Oct. 27, 1969
[45] Patented Jan. 4, 1972
[73] Assignee Toyo Kogyo Co., Ltd.
 Hiroshima, Japan
[32] Priority Oct. 31, 1968
[33] Japan
[31] 43/95251

[54] HYDRAULIC GOVERNOR
 2 Claims, 3 Drawing Figs.
[52] U.S. Cl. ................................. 137/54, 137/56
[51] Int. Cl. ........................................ G05d 13/30
[50] Field of Search .......................... 137/53, 54, 56

[56] References Cited
UNITED STATES PATENTS
2,711,749 6/1955 Hettinger, Jr. ............... 137/56
3,431,928 3/1969 Pierce, Jr. ..................... 137/54

Primary Examiner—Robert G. Nilson
Attorney—Sughrue, Rothwell, Mion, Zinn & Macpeak ABSTRACT: A hydraulic governor involves a rotary shaft carrying a valve body fixed thereto and primary and secondary valve elements slidably inserted into the valve body. A spring urges the primary valve element to produce a primary governor pressure rising from a predetermined speed. The primary governor pressure acts in a direction against the centrifugal force acting on the secondary valve element for producing a secondary governor pressure larger than the primary governor pressure at a varying rate. This governor may produce a stable governor pressure since the governor pressure is not affected by variations in line pressure.

INVENTOR
TETSUO SHIMOSAKI

HYDRAULIC GOVERNOR

BACKGROUND OF THE INVENTION

1. Field of the Invention

This invention relates generally to hydraulic governors for converting centrifugal force acting on a governor weight and valve elements into an oil pressure, or a governor pressure from rotation of a rotary shaft, and more particularly to an improvement in a hydraulic governor adapted to control hydraulic pressure of an automatic transmission for an automobile.

2. Description of the Prior Art

An automatic transmission for automobiles generally includes shift valves for shifting a plurality of power trains. The shift valves are operated by a governor pressure proportional to the rotational speed of a driven shaft, or the vehicle speed and a throttle pressure proportional to the torque generated in the engine in order to be on or off in accordance with the variations of the vehicle speed and the torque generated in the engine. A shifting of the power trains is carried out in response to the variations of these pressures. For this reason, the governor pressure regulated by the hydraulic governor is preferably to change in sensitivity in all ranges of rotation of the driven shaft, in which the shifting operation of the power trains is carried out.

However, since this type of hydraulic governor for the automatic transmission transfers the centrifugal force raised by the rotation of the driven shaft into a hydraulic pressure or governor pressure, and moreover transfers the line pressure into the governor pressure in proportion to the centrifugal force, the governor pressure characteristics are such that the varying amplitude of the governor pressure in low-speed range is smaller than that in the high-speed range and that its maximum value is limited by the amplitude of the line pressure. Accordingly, if the varying rate of the governor pressure in all ranges is made larger in order that the varying amplitude of the governor pressure in the low-speed range is relatively larger, the governor pressure becomes the line pressure which is the maximum value of the governor pressure before it reaches maximum shiftable rotating speed, with the result that the transmission cannot be shifted by the shift valve by means of the governor pressure in the neighborhood of high vehicle speed. On the other hand, if the varying rate of the governor pressure is made small so that the governor pressure is able to vary within the range of maximum shiftable rotating speed, the varying amplitude of the governor pressure in low-speed range becomes quite small with the result that the shift valve is difficult to be controlled accurately in a predetermined speed by the governor pressure in low-speed range.

For this reason, a method has been proposed to obtain new governor pressure characteristic $c'$, as shown in FIG. 3, by adding governor pressure characteristic $a'$ which is sensitive in low-speed range, and reaches the line pressure, that is the maximum value of the governor pressure within the low-speed range as a signal to governor pressure characteristic $b'$ which lacks sensitivity in low-speed range, but varies over all of the rotating range with the result that relatively good governor pressure characteristics are obtained thereby. However, in such an arrangement, the line pressure being the maximum value of the governor pressure characteristic $b'$ always varies by being controlled by the torque generated in the engine or gear ratio. Thus, in the aforementioned method using the varying line pressure always as a signal, the governor pressure taken out is not preferable for actual use due to its unstability.

SUMMARY OF THE INVENTION

This invention contemplates to eliminate the aforementioned disadvantage of the conventional hydraulic governor and provide a new and improved hydraulic governor which comprises a rotary shaft, a valve body fixed to said rotary shaft and primary and secondary valve elements slidably inserted into the valve body. A spring urges said primary valve element to produce a primary governor pressure rising from a predetermined speed, wherein said primary governor pressure operates in a direction against the centrifugal force of the secondary valve element for producing a secondary governor pressure varying rate larger than the primary governor pressure.

BRIEF DESCRIPTIONS OF THE DRAWINGS

DESCRIPTION OF THE PREFERRED EMBODIMENT

Figure 1:
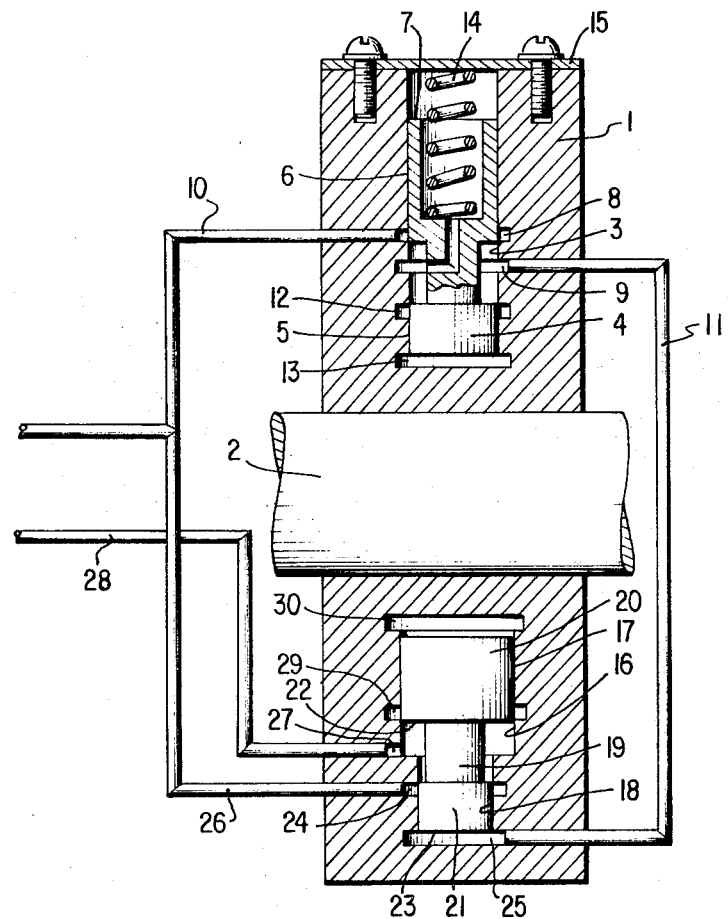
FIG. 1 is a longitudinal sectional view of one embodiment of a hydraulic governor constructed in accordance with the present invention.

Reference is now made to FIG. 1, which shows one example of a hydraulic governor constructed according to the present invention.

The hydraulic governor comprises a rotary shaft 2, and a valve body 1, fixed to the rotary shaft 2. A primary cylinder 3 has a first valve element 4 slidably inserted therein and has lands 5 and 6 formed thereon. Land 6 has a pressure-receiving surface 7 for pushing the first valve element 4 inwardly under operation of hydraulic pressure. An annular oil passage port 8 communicates with the line pressure oil passage 10 and an annular oil passage port 9 communicates with the primary governor pressure oil passage 11. Annular oil discharge ports 12 and 13 are provided in the primary cylinder 3. A spring 14 urges the first valve element 4 toward the rotating center and is disposed in compression, between the first valve element 4 and a stopper 15. A secondary cylinder 16 has a large-diameter portion 17 and a small-diameter portion 18. A secondary valve element 19 is slidably inserted into the secondary cylinder 16 and has lands 20 and 21 corresponding to the large-diameter portion 17 and small-diameter portion 18 of the secondary cylinder 16 respectively. Land 20 has a pressure-receiving surface 22 for pushing the second valve element 19 inwardly by the application of pressure. Land 21 has a pressure-receiving surface 23 for pushing inwardly, the second valve element 19, by the operation of the primary governor pressure. An annular oil passage port 24 communicates with the line pressure oil passage 26. An annular oil passage port 25 communicates with the primary governor pressure oil passage 11. A port 27 communicates with the secondary governor oil passage 28, and annular oil discharge ports 29 and 30 are provided in the secondary cylinder 16.

In operation of the hydraulic governor thus constructed, when line pressure is supplied through the line pressure oil passages 10 and 26 to the oil passage ports 8 and 24, respectively, if the valve body 1 is rotated together with the rotary shaft 2, the primary and secondary valve elements 4 and 19 are urged outwardly by centrifugal force to operate themselves.

Figure 2:
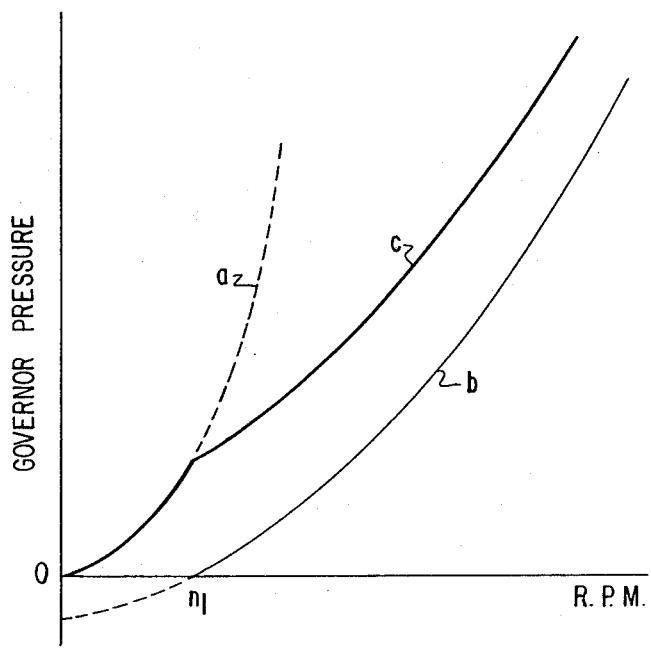
FIG. 2 is a graphical representation of the governor pressure of the hydraulic governor shown in FIG. 1.
Figure 3:
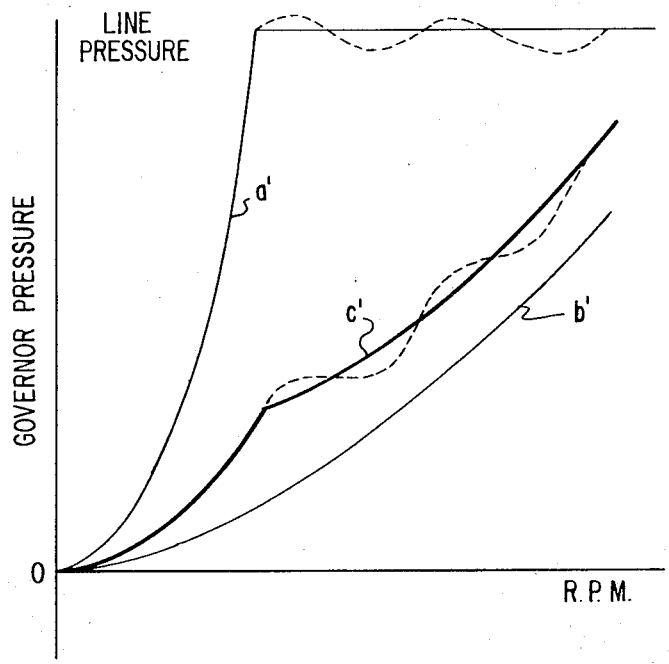
FIG. 3 is a graphical representation of the governor pressure of a conventional governor.

If the rotating speed of the rotary shaft 2 is within the range from zero to $n_1$ shown in FIG. 2, the primary valve element 4 doesn't get to slide outwardly against the tension of the spring 14 with the result that the oil passage port 8 is not open so that primary governor pressure is not generated. At this time, the secondary valve element 19 slides outwardly by the centrifugal force so that the oil passage port 24 is in communication with the oil passage port 27. Whereupon, part of the line pressure supplied from the oil passage port 24 acts on the pressure-receiving surface 22 of the secondary valve element 19 to push the secondary valve element 19 inwardly. For this reason, the characteristic of the governor pressure preferably has a large varying amplitude in the low-speed range as shown by the line 0–$a$ in FIG. 2, by the balance between the pressing force of the line pressure for pushing the secondary valve element 19 inwardly and the centrifugal force actuated on itself.

If the centrifugal force for operating the primary valve element 4 reaches a predetermined force of spring 14 after the rotating speed of the rotary shaft 2 becomes over $n_1$, the primary valve element 4 slides outwardly with the result that the oil passage port 8 communicates with the oil passage port 9. Whereupon, part of the line pressure acts on the pressure-receiving surface 7 through the oil passage port 8 so that it forces the primary valve element 4 inwardly, with the result that centrifugal force on the primary valve element 4 itself balances the pressing force of the spring 14 and part of the line pressure.

Thus, if the speed increases and accordingly the centrifugal force of the governor increases, the primary governor pressure also increases in balance therewith. Thus, the primary governor mechanism has the primary governor pressure characteristics shown by the curve $b$ in FIG. 2.

The primary governor pressure communicates with the oil passage port 25 through the primary governor pressure oil passage 11 so that it acts on the pressure-receiving surface 23 of the secondary valve element 19 with the result that the secondary valve element 19 is urged inwardly in proportion to the primary governor pressure.

Now, the secondary valve element 19 is balanced between the centrifugal force operating the secondary valve element 19 itself and a pressing force exerted by the line pressure, for pushing the receiving surface 22 inwardly, and in addition the primary governor pressure acting on the pressure-receiving surface 23; whereby the force pushing the secondary valve element 19 inwardly is increased. Thus, as shown in FIG. 2, when the rotating speed of the rotary shaft 2 is over $n_1$, the governor pressure does not become high unless relatively stronger centrifugal force occurs. It follows that the governor pressure does not become larger with respect to the rotating speed so that the governor pressure characteristic becomes a preferable curve designated by $c$ in FIG. 2.

It is understood from the foregoing description that stable governor pressure characteristics can be obtained without the influence of varying unstable line pressures because it is not utilized as a constant pressure.

What is claimed is:

1. A hydraulic governor comprising in combination, a valve body fixed to a rotary shaft and rotatable therewith, a primary cylinder formed in said valve body and having a primary valve element slidably disposed therein, said primary cylinder having an inlet port and an outlet port, said inlet port being connected to a source of hydraulic fluid pressure, said primary valve element acting to move radially outwardly at a predetermined rate in response to an increase in speed of said rotary shaft to provide a primary governor pressure at said outlet port which varies in response to said increase in speed in said rotary shaft, a secondary cylinder formed in said valve body having a secondary valve element slidably disposed therein, said secondary cylinder having a first inlet port connected to said source of hydraulic fluid pressure, a second inlet port connected to the outlet port of said primary cylinder, and an outlet port for supplying a governor output pressure, said secondary valve element being movable radially outwardly from said rotary shaft at a predetermined rate in response to an increase in the speed of said rotary shaft, said rate of movement of said secondary valve element being greater than the rate of said primary valve element, said first inlet port of said secondary cylinder being communicated with said outlet port by movement of said secondary valve piston to supply a governor pressure, said governor pressure being regulated at a first rate in response to the radially outward movement of said secondary valve element alone when the speed of said rotary shaft is below a predetermined value, said primary valve element being moveable radially outward when the speed of said rotary shaft is above said predetermined value to communicate the inlet port of said primary cylinder with the outlet port thereof to supply said hydraulic fluid pressure to said second inlet port of said secondary cylinder to move said secondary valve element radially inward against the centrifugal force acting thereon to cause the governor output pressure to be regulated at a second predetermined rate when the speed of said rotary shaft is above said predetermined value.

2. A hydraulic governor as claimed in claim 1, further comprising a spring means operatively connected to said primary valve element for forcing said primary valve element radially inwardly against the centrifugal force acting thereon to block communication of said inlet port of said primary cylinder with the outlet port thereof to maintain the pressure in said connecting means between said primary and secondary cylinders at zero value below said predetermined speed of said rotary shaft.

* * * * *